US007516229B2

(12) United States Patent
Trastour et al.

(10) Patent No.: US 7,516,229 B2
(45) Date of Patent: Apr. 7, 2009

(54) METHOD AND SYSTEM FOR INTEGRATING INTERACTION PROTOCOLS BETWEEN TWO ENTITIES

(75) Inventors: David Trastour, Bristol (GB); Christopher William Preist, Bristol (GB); Derek Coleman, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1050 days.

(21) Appl. No.: 10/717,206

(22) Filed: Nov. 18, 2003

(65) Prior Publication Data

US 2004/0139095 A1 Jul. 15, 2004

(30) Foreign Application Priority Data

Nov. 18, 2002 (GB) .................................. 0226778.9

(51) Int. Cl.
*G06F 15/16* (2006.01)
*G06F 17/00* (2006.01)
(52) U.S. Cl. ........................................ 709/230; 715/234
(58) Field of Classification Search .................. 709/230; 715/222, 237, 239
See application file for complete search history.

(56) References Cited

U.S. PATENT DOCUMENTS

2002/0178103 A1* 11/2002 Dan et al. ..................... 705/37
2006/0167946 A1* 7/2006 Hellman et al. .......... 707/104.1

OTHER PUBLICATIONS

Trastour, David, et al. "Semantic Web Support for the Business-to-Business E-Commerce Lifecycle", WWW2002, May 7-11, 2002.*
Boulmakoul, A., et al., "Nile: Automating B2B Connections Between Trading Partners," pp. 1-20 (2001).
Hofreiter, B., et al., "Towards Syntax-Independent B2B," ERCIM News, vol. 51 Internet: <http://www.ercim.org/publication/Ercim_News/enw51/hofreiter.html> pp. 1-3 (Oct. 2002).
Horrocks, I., "Reasoning With Expressive Description Logics: Theory and Practice," Proceedings of the 18th International Conference On Automated Deduction (CADE-S8), No. 2392 in Lecture Notes in Artificial Intelligence, pp. 1-15 (2002).
Object Management Group, Object Constraint Language Specification, Version 1.1, pp. i-iii, 1-32 (Sep. 1, 1997).
"PIP® Business Document Header PIP Component Content Specification Guide," RosettaNet, pp. i, i-iii, 5-10 (Oct. 25, 2001).
"PIP® Specification Guide," RosettaNet, pp. i-iv, i-iv, 1-40 (Nov. 12, 2001).
"Primitives PIP® Component Content Specification Guide," RosettaNet, pp. i, i-iii, 5-8 (Oct. 25, 2001).

(Continued)

*Primary Examiner*—Dustin Nguyen
*Assistant Examiner*—Michael E Keefer

(57) ABSTRACT

A method of and system for defining a common interactions protocol between two entities is described. The method comprises inputting a description of each entity's messaging guidelines, the description including the entity's constraints on interacting with the other entity; calculating the union of the two descriptions; determining whether the union is satisfiable using a constraint resolver; providing the intersection of the two descriptions as the common interactions protocol if the union is satisfiable; and indicating where any incompatibility lies if the union is not satisfiable.

8 Claims, 8 Drawing Sheets

OTHER PUBLICATIONS

"Tax PIP® Component Content Specification Guide," RosettaNet, pp. i, i-iii, 5-9 (Oct. 25, 2001).

"RosettaNet," Internet: <http://searchwebservices.techtarget.com/sDefinition/0,,sid26_gci214634,00.html> 1 page total (Feb. 26, 2003).

"RosettaNet: General FAQ," Internet: <http://www.rosettanet.org/RosettaNet/Rooms/DisplayPages/LayoutInitial?Container=com.webridge.entity.Entity%BOID%5B887E9F9AC...> pp. 1-5 (Feb 26, 2003).

Smith, M., et al., "Web Ontology Language (OWL) Guide Version 1.0," Internet: <http://www.w3.org/2001/sw/WebOnt/guide-src/Guide.html> pp. 1-50 (Feb. 3, 2003).

"Web Ontology Language (OWL) : Overview," Internet: <http://www.ksl.stanford.edu/people/dlm/webont/OWLOverview.htm> pp. 1-11 (Feb. 18, 2003).

"XSD," Internet; <http://searchwebservices.techtarget.com/sDefinition/0,,sid26_gci831325,00.html> 1 page total (Feb. 26, 2003).

* cited by examiner

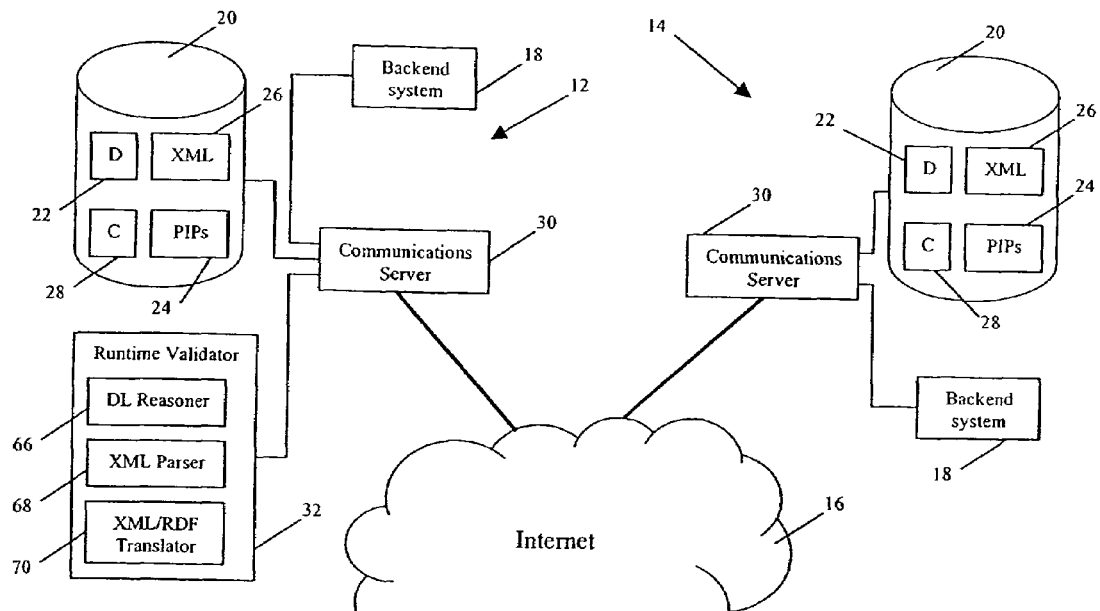
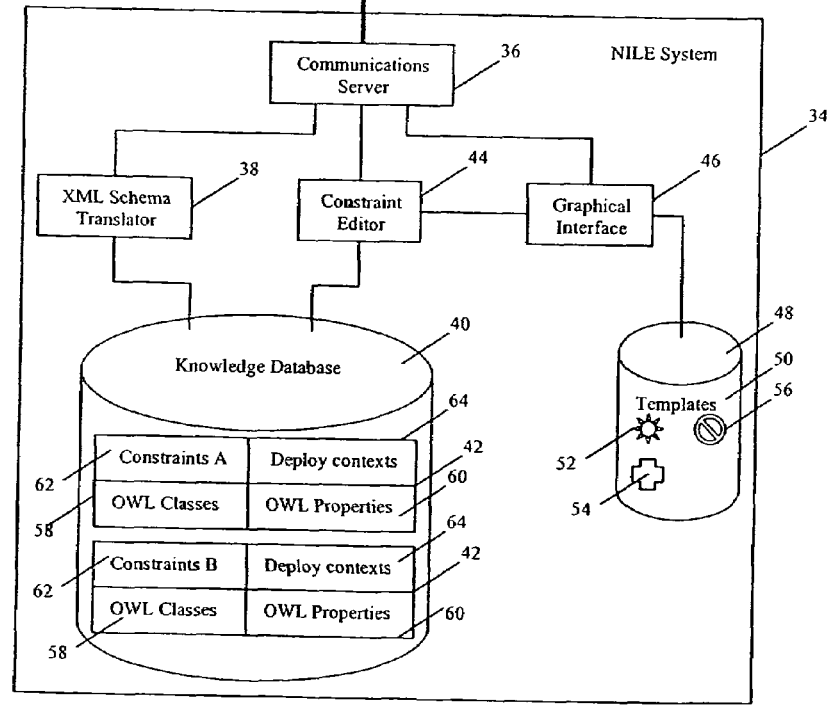
Figure 1

1. The root schema element, complexType definitions, model group definitions and attributeGroup definitions are mapped to OWL classes.

2. Named simpleType definitions stay untouched; anonymous simpleType definitions are assigned a unique name and copied to a separate datatype file. These simpleType definitions are used to restrict datatype properties.

3. complexType elements are mapped to OWL object properties; simpleType elements and attributes are mapped to OWL datatype properties.

4. Type and occurrence specifiers of elements and attributes are mapped to an intersection of OWL property type (i.e. toClass) restrictions and cardinality restrictions.

5. extension and restriction definitions are mapped to an OWL subClassOf relationship.

6. Groups with a choice compositor are mapped to the OWL equivalent of an XOR (with intersectionOf, unionOf and complementOf).

7. Groups with an all or sequence compositor are mapped to an OWL intersectionOf collection.

8. substitutionGroup relationships are mapped to an OWL subPropertyOf relationship.

9. Names of components are always mapped to an URI composed of the schema targetNamespace, # and the component's name.

Figure 6

| Constraint | Deployment Context | | | |
|---|---|---|---|---|
| | Document | Sender | Receiver | Backend System |
| A | PIPC3 | NewCo | A | SAP1 |
| B | Any | A or B | C | All SAP |
| C | PIPC2/3 or PIPC7 | NewCo or A or C | B or D | All SAP or all Oracle |
| D | EPPartners and PIPC4 | B | A or C | SAP1 or SAP2 |
| E | USClients | D or C | NewCo or A | SAP1 |
| ... | ... | ... | ... | ... |
| ... | ... | ... | ... | ... |

METHOD AND SYSTEM FOR INTEGRATING INTERACTION PROTOCOLS BETWEEN TWO ENTITIES

FIELD OF THE INVENTION

The present invention relates to a method and system for integrating interaction protocols between two entities, and more particularly, though not exclusively to a method and system using semantic web technology to enhance existing business-to-business communications/interaction protocols such as RosettaNet. The present invention also has application to providing easier access to the new and complex ways of describing interactions in the semantic world.

BACKGROUND TO THE INVENTION

Despite the bursting of the dot corn bubble, electronic commerce continues to be an increasingly important aspect of the economy. To the general public, the most visible face is the increasing number of Business-to-Consumer interactions available via the web. However, the majority of economic transactions occur between businesses, making the Business-to-Business (B2B) aspect of electronic commerce a significantly larger market and hence more important area for improvements.

Historically, business relationships have been long-term. When such a relationship has been established, EDI (Electronic Data Interchange) technology can be used to automate certain straightforward interactions between the business partners—for example, the purchase of goods at a pre-agreed price, and the delivery of them. Setting up the EDI system requires the two parties to agree on interaction protocols and message formats, and to implement a messaging system that meets these agreements—often over a Virtual Private Network. This can be a time-consuming and costly process.

RosettaNet (www.rosettanet.org) is an industrial consortium which aims to make this process cheaper and more straightforward, by using XML (extensible Mark-up Language) messaging technology transported over the World Wide Web. It does this by standardising the format, content and sequence of messages between partners for a variety of possible interactions which companies can use in B2B relationships. Hence, companies do not need to go through a lengthy negotiation to specify the way in which they are going to interact. Instead, they simply need to agree on which standard interaction to use. Standardisation also speeds up the development process: products such as WebMethods Trading Networks Server include software libraries and XML templates supporting RosettaNet interactions.

This standardisation effort has substantially reduced the cost and time of setting up a B2B relationship. However, because it is based on XML technology, the tools provided are primarily syntactic, rather than semantic. Semantic constraints on interactions are currently represented informally and require manual interpretation. The standardisation has also necessarily maintained some flexibility to allow companies with different internal processes to comply with the standard.

An overview of RosettaNet together with some of the problems that implementors encounter when they deploy RosettaNet solutions is now described.

RosettaNet standards have gone a long way to ease the process of setting up and executing long-term B2B relationships via the World Wide Web. The key concept used to do this is the Partner Interface Process (PIP). PIPs are used to define standard ways of interacting between companies to carry out a specified task. They define the aspects of a business process which are common to the two parties, but place no constraints on how the internal processes implement these common aspects. A PIP specification defines the flow of message documents which will take place during an interaction, and also specifies the format of the messages. A message format is defined through 'message guidelines' documentation, and an XML DTD (Document Type Definition) describing the syntactic structure a message should have.

Hence, in theory, all businesses have to do to set up a new partnership (involving the creation of a interaction protocol) is to agree on which PIPs to use, and implement the PIPs according to their specification. However, as different businesses can have different back-end processes, some flexibility within the standards is necessary to enable all businesses to satisfy it. For example, one business may normally represent dates on invoices using ISO 8601 format (YYYY-MM-DD) while another may use UK common practice (DD/MM/YYYY). One business may expect the account details of the buyer on an invoice, while another may not. To allow differences such as these, PIP definitions often make use of generic datatypes (such as strings or integers) and include optional fields or fields with unbounded cardinalities. As a result of this flexibility, there is no guarantee that two RosettaNet compliant companies will be able to communicate with each other: different business practices or back-end systems may impose different conditions on the presence of some information or on its format. Because of this, it is necessary to reconcile the different processes used by two companies which intend to interact via RosettaNet. There is some flexibility in the way in which a PIP can be implemented, and it is necessary that interacting parties agree as to the specific implementation chosen. This process of reconciliation is currently carried out off-line, using spreadsheets to document decisions. Developers then implement these decisions as they encode the PIPs. This can be a very time-consuming process, meaning that it can take many months to create a new RosettaNet partnership. Hence interoperability, one of the advantages of standardisation, is sacrificed in favour of flexibility.

RosettaNet are currently developing Next Generation PIPs (see RosettaNet Next Generation architecture at http://rosettanet.org/nextgenarchitecture) in an attempt to produce specifications than are more formal than the message guidelines used in the current standards. For each Next Generation PIP, RosettaNet specifies a UML (Unified Modelling Language) class diagram (see Object Management Group. *Object Constraint Language Specification, Version* 1.4, September 2001) and XML Schemas that replace the XML DTDs. The UML class diagram defines the business objects —such as financial documents or purchase requests—that are used in the PIP. To encourage reuse across PIPs, RosettaNet defines a domain model, i.e. a set of base classes that can be reused or subclassed in the UML class diagrams. The XML Schemas define what makes an XML document a syntactically valid PIP document. XML Schemas are defined manually from the UML class diagram.

Having an explicit machine-readable representation of the constraints imposed by a PIP makes setting up a partnership quicker and easier. Reconciliation can take place by agreeing a set of further constraints on each XML Schema within the PIP. Furthermore, having the agreed document structure specified in this format allows the developers to use tools such as Contivo (see http://www.contivo.com) to rapidly automate the process of document generation. However, this approach has several disadvantages:

The constraints that XML Schema are able to represent are mainly constraints on the syntax, not the semantics, of documents. This means certain constraints which appear in a PIP specification which cannot be represented in the XML Schema. A typical example of this sort of constraint is a dependency between fields, for instance the presence of a field implying a cardinality constraint on another field. RosettaNet uses OCL (Object Constraint Language) (see Object Management Group. *Object Constraint Language Specification, Version* 1.4, September 2001) to represent such constraints in the definition of Next Generation PIPs. These are documented as comments within the XML Schemas.

As seen earlier, a company's business processes impose constraints on the deployment of PIPs. Some of these constraints are of syntactic nature and can usually be captured in an XML Schema—which must be more specific than the PIP XML Schema. Some may be of semantic nature and so cannot be expressed in the XML Schema. Companies deploying RosettaNet PIPs usually document these semantic constraints in the form of spreadsheets that are manually created for the purpose of one deployment.

Additional constraints imposed during the reconciliation process may also be semantic in nature, and therefore cannot be represented in a machine-readable format.

The same business object class may appear in several documents exchanged during an interaction. Constraints imposed on this class should be applied to all documents that use this class (either directly or through a subclass). Currently, this will mean editing the entire associated schema to include the constraint. This imposes an unnecessary burden on the developers, and can potentially pose maintenance problems.

Constraints on a business object class depend on the context (i.e. the specific deployment scenario) in which this class is used.

The Next Generation PIP cannot adequately manage the application of different constraints in different circumstances. Currently, the developers would have to manually aggregate the constraints corresponding to a deployment context into refined XML Schemas and other informal documents—when XML Schema is not expressive enough. This is inefficient and could pose maintenance problems. Moreover, since these constraints are not captured in a formal and systematic way, some knowledge could be lost from one deployment to the next.

The same constraint may apply to a certain class of partners. For instance, a back-end system could impose a constraint on a Tax class for all its European partners. Similarly, it should be possible to apply constraints on classes of PIP documents (e.g. invoicing documents) or business processes (e.g. Electronic component purchasing). However, this cannot be carried out without editing all of the associated schema to include the constraint, and as has been mentioned above this imposes an unnecessary burden on the developers, and can potentially pose maintenance problems.

In *Towards syntax-independent B2B* by B. Hofreiter, C. Huemer, and W. Winiwarter, (*ERCIM News*, 51:25-26, October 2002) there is a recognition that many B2B vocabularies and interaction protocols are not interoperable because businesses use different subsets of the standards. The proposed solution of this prior art paper is to generate specific syntax (with XML Schema) out of a semantic layer (with RDF (Resource Description Framework) Schema) capturing business requirements. However, this solution does provide a solution which takes into consideration the compatibility of the solution with existing business partners' constraints. Furthermore the validation is still manually implemented.

Several solutions have already been proposed to bridge the gap between XML and RDF to provide rich semantic descriptions to XML applications. Some solutions are application specific—such as in 'Combining RDF and XML Schemas to Enhance Interoperability Between Metadata Application profiles', J. Hunter and C. Lagoze in *Proceedings 10th International World Wide Web Conference* (*WWW*10), 2001 which uses a combination of XML Schema and RDF Schema. The lack of ability to generalise the solution means it has limited application to problems generally. Some others solutions are more general but disadvantageously require changes to XML or RDF.

OBJECT AND SUMMARY OF THE PRESENT INVENTION

It is an object of the present invention to overcome or reduce at least some of the above described problems associated with the known interaction protocols and to provide an improved way of integrating existing interaction protocols between two parties wishing to establish a new common communications protocol.

According to one aspect of the present invention there is provided a method of defining a common interactions protocol between two entities, the method comprising: inputting a description of each entity's messaging guidelines, the description including the entity's constraints on interacting with the other entity; calculating the union of the two descriptions; determining whether the union is satisfiable using a constraint resolver; providing the intersection of the two descriptions as the common interactions protocol if the union is satisfiable; and indicating where any incompatibility lies if the union is not satisfiable.

One of the main reasons for seeking the establishment of an interactions protocol between two different entities, is to provide automation of understanding of business communications. The benefits of this approach and the invention are seen when the volumes of transactions being communicated are large.

This aspect of the present invention involves two business partners specifying their respective interaction protocols to a system using the present invention. The system then automatically determines whether there is a common protocol which meets both partners' specifications (for example when they want to deploy a particular sequence of PIPs with partner specific constraints) and if so, provides this common interaction protocol automatically to both sides for use in interactions. However, if there is no common protocol, the system can provide the specifics of where the incompatibility lies such that each partner can then take a view on altering a specific part of their interactions protocol to enable there to be a commonly accepted protocol.

The advantage of this aspect of the present invention is that it saves time. This process provides intelligent feedback as to what needs to be done to enable a common interactions protocol to be established, a task which takes many man hours currently. This is also a frequently occurring task as initially, many companies may specify their ideal requirements (minimum amount of changes to be applied) before accepting a compromised protocol, on a subsequent iteration, which is commonly acceptable to their business partner.

One of the most beneficial applications of this aspect of the present invention is seen when it is used in conjunction with conditional constraint application on the basis of deployment context, as companies can specify their general interactions protocol (PIPS and specific constraints for example) with all companies and this can be used to determine whether specific interaction relationships can be supported. Specific protocol requirements (constraints in particular) may be provided which are usable for determining whether a particular interaction with a business partner is possible. In addition, this could be used to check the potential compatibility of a proposed interaction that each partner has for this particular interaction protocol.

The first aspect of the present invention also extends to a system for defining a common interactions protocol between two entities, the system comprising: data input means for inputting a description of each entity's messaging guidelines; the description including the entity's constraints on interacting with the other entity; a constraint resolver for calculating the union of the two descriptions and determining whether the union is satisfiable; means for providing the intersection of the two descriptions as the common interactions protocol if the union is satisfiable; and means for indicating where any incompatibility lies if the union is not satisfiable.

According to a second aspect of the present invention there is provided a method of expressing messaging constraints on a model of an interaction protocol between two business partners, the method comprising: specifying document constraints in a general way such that they are applicable to a plurality of specific instances/classes of objects/processes; and linking each constraint to a particular deployment context in which that constraint is to be applied; wherein when a run-time solution of the interaction protocol is deployed, it can be decided depending on the deployment context whether or not each constraint applies to any document.

The second aspect of the present invention allows developers to explicitly represent the constraints on interactions in different contexts and to re-use constraints between messages and businesses. This advantageously makes the process of setting up new relationships faster and the resulting software is more reliable and re-usable.

To have constraints expressed in this way allows the system to check the compatibility of the constraints with all the business partners in an automated way. Also, constraints are expressed in a more general way since they can apply for multiple deployed solutions; this promotes reuse of the constraints.

The present inventors have appreciated that that for RosettaNet implementations the deployment context is a function of:
1. the PIP Document being used;
2. the trading partner one is doing business with and whether they act as a buyer or seller (PIPs are often asymmetric);
3. the business process being used (different business processes using a given PIP with a given trading partner may impose different constraints because of business requirements of back-end systems).

This has lead to the appreciation of the second aspect of the present invention.

Whilst the present invention has been described in the context of RosettaNet, the invention is applicable to any interaction model based on an object-oriented or XML description language. A significant advantage over RosettaNet system is that the specific disadvantages of PIPs (Partner Interface Processes) including Next Generation PIPs are overcome. This allows sophisticated semantic and/or syntactic constraint situations to be handled relatively easily, such as the conditional application of a different constraint to an object in a given circumstance. Also enables the application of such sophisticated constraints to whole classes of objects or processes and enables inheritance of such constraints according to class/object relationships.

The second aspect of the present invention also extends to a system for expressing messaging constraints on a model of an interaction protocol between two business partners, the system comprising: a constraint processor for specifying document constraints in a general way such that they are applicable to a plurality of specific instances/classes of objects/processes; and structuring means for linking each constraint to a particular deployment context in which that constraint is to be applied; wherein when a run-time solution of the interaction protocol is deployed, it can be decided depending on the deployment context whether or not each constraint applies to any document.

According to a third aspect of the present invention there is provided a method of expressing semantic constraints on a model of a business interactions protocol described by a semantic ontology language, the method comprising: providing a cardinality type constraint template for inputting cardinal constraints; providing a data format type constraint template for inputting data format constraints; providing an interdependency of field type constraint template for inputting interdependency of field constraints; and converting data input via the templates into the semantic ontology language whereby semantic constraints relating to RosettaNet implementations can be input relatively easily into the model.

This third aspect of the invention addresses the problems users face with trying to keep up with the complexities of programming in OWL for example.

The advantage of this invention is that it hugely simplifies use of semantic ontology language (DAML+OIL or OWL) so that non-expert users can use them to input additional constraints and edit existing constraints in a semantic ontology for example. The complexities of the language are thus hidden from the user such that the updating of the model with specifics becomes much easier.

According to a fourth aspect of the present invention, there is provided a method of converting a RosettaNet implementation of an interaction protocol of an entity into a syntactic and semantic ontology describing the interaction protocol, the method comprising: receiving XML schemas and documents which comprise Partner Interface Processes (PIPs); converting the XML schemas into a hierarchy of classes, instances of classes, properties and constraints to create a skeleton semantic ontology expressed in a semantic ontology language; the converting step utilising predetermined mappings of XML to the semantic ontology language; inputting further context-specific constraints from the entity into the skeleton semantic ontology, these constraints not being expressible formally in the XML schema of Rosettanet; and using the resultant semantic and syntactic interaction model as a machine readable model on which automated machine reasoning can be carried out.

The advantage of such a model is that it can be used generally to allow automated machine reasoning to be carried out on the interaction model such that the system can detect if interactions are possible between two business partners or even to ensure that different processes within the same organisation are compatible, by allowing implementation of agreed syntactic and semantic constraints without altering each partner's business process. This saves time and reduces cost of any such process. In addition, the by-product of this process is that a syntactical and semantic definition of a document acceptable to both partners can be obtained which can be used for standardising document interactions between the partners.

The fourth aspect of the present invention also extends to a system for converting a RosettaNet implementation of an interaction protocol of an entity into a syntactic and semantic ontology describing the interaction protocol, the system comprising: a receiver for receiving XML schemas and documents which comprise Partner Interface Processes (PIPs); a converter for converting the XML schemas into a hierarchy of classes, instances of classes, properties and constraints to create a skeleton semantic ontology expressed in a semantic ontology language; the converter utilising a store of predetermined mappings of XML to the semantic ontology language; input means for inputting further context-specific constraints from the entity into the skeleton semantic ontology, these constraints not being expressible formally in the XML schema of Rosettanet; and means for using the resultant semantic and syntactic interaction model as a machine readable model on which automated machine reasoning can be carried out.

According to a fifth aspect of the present invention, there is provided a method of validating a document received as part of an agreed interaction protocol between two entities using a semantic/syntactic ontology, the method comprising: Validating the syntax of the document by: comparing its syntactic structure with the predetermined syntactic structure which forms part of the agreed interaction protocol; and validating the semantic constraints of the document by: translating the document into RDF data and using a Description Logic reasoner to compare the RDF data with that of the semantic constraint of the agreed interaction protocol.

This aspect of the present invention enables the possibility of errors/bugs in the documents to be checked at run time, and this is done by running a check on the agreed interaction protocol between the partners.

A further advantage of this fifth aspect of the invention is that it enables validation to be done at run-time without the need for any further software development specific to that process. At present in order to carry out runtime validation of interactions, one has to take the agreed constraints, hard code them, for example into an XSLT translation, and then run the translation for each interaction as the validation. However this process takes time and is prone to errors and more importantly is not dynamic, because one has to re-engineer the validation coding each time there is a change in the constraints. The invention overcomes these by providing a dynamic validation based directly on the syntactic/semantic model.

The fifth aspect of the present invention also extends to a system for validating a document received as part of an agreed interaction protocol between two entities using a semantic/syntactic ontology, the system comprising: a syntax validator arranged to validate the syntax of the document by: comparing its syntactic structure with the predetermined syntactic structure which forms part of the agreed interaction protocol; and a semantic document validator arranged to validate the semantic constraints of the document by: an RDF translator for translating the document into RDF data and a Description Logic reasoner which has been used to compare the RDF data with that of the semantic constraints of the agreed interaction protocol.

The above aspects of the present invention are embodied in an exemplary system (referred to as the Nile System) described hereinafter that can manage the relationship between a business and several different partners by formally capturing the constraints on RosettaNet deployments. It is able to automatically detect if interactions are possible with a new potential partner, and can support the reconciliation process by allowing implementation of both syntactic and semantic constraints agreed by the partners. The system is able to determine exactly which constraints to apply depending on the deployment context, and is able to automatically generate an appropriate schema to communicate with the business partner.

The present invention eases the B2B integration process, and overcomes in large part the shortfalls of RosettaNet (even with Next Generation PIPs) outlined above. The present invention makes use of XML Schema to define and validate the syntactic constraints on PIP documents. It also makes use of a semantic mark-up language for Web resources such as DAML+OIL (see www.daml.org 2001) or OWL (Web Ontology Language—see www.w3.org/2001/ sw/WebOnt) to define semantic constraints. As will be better seen in the specific description, the semantic mark-up language is used to model:

the business object class hierarchies and their attributes (or properties in Semantic Web terms);
the semantic constraints on business objects coming from the PIP definitions (currently modelled in OCL);
the notion of deployment context;
the additional semantic constraints imposed by a business with respect to a deployment context.

OWL provides a single solution to model business objects and their associated constraints (both generic and context dependent). However current B2B standards do not make use of OWL but often rely on XML Schema to define the syntax of the documents being exchanged.

One embodiment of the present invention is directed to an application of Semantic Web technology to enhance RosettaNet and further reduce cost and time. Businesses can represent the possible ways they are able to interact as semantic constraints. Two businesses can determine if they are able to interact without altering their business process by sharing constraints, and finding if the overall set is satisfiable. They can use the other business' constraints to generate documents which meet the constraints, and so are usable by the other business.

This embodiment is evolutionary, rather than revolutionary. It accepts existing RosettaNet design decisions and tools as they currently are, rather than requiring modification or re-design of these. As a result of this, it is more likely to be rapidly accepted and adopted by the current B2B developer community. This means it must use Semantic Web technology in a relatively conservative way. It is considered that by doing this the developer community will become more familiar with the basic ideas, allowing more radical approaches to be taken in the future.

BRIEF DESCRIPTION OF THE DRAWINGS

In order that the present invention can be more readily understood, reference is now made, by way of example, to the accompanying drawings in which:

FIG. 1 is a schematic diagram showing two entities/parties wishing to establish an interactions protocol and a first embodiment of the present invention connected via a communications network with the two entities;

FIG. 6 is a listing diagram showing a list of basic mappings for use by the XML Schema translator of FIG. 1 in converting XML Schema into an OWL representation for storage in the knowledge database;

DETAILED DESCRIPTION OF A PRESENTLY PREFERRED EMBODIMENT

Figure 2:
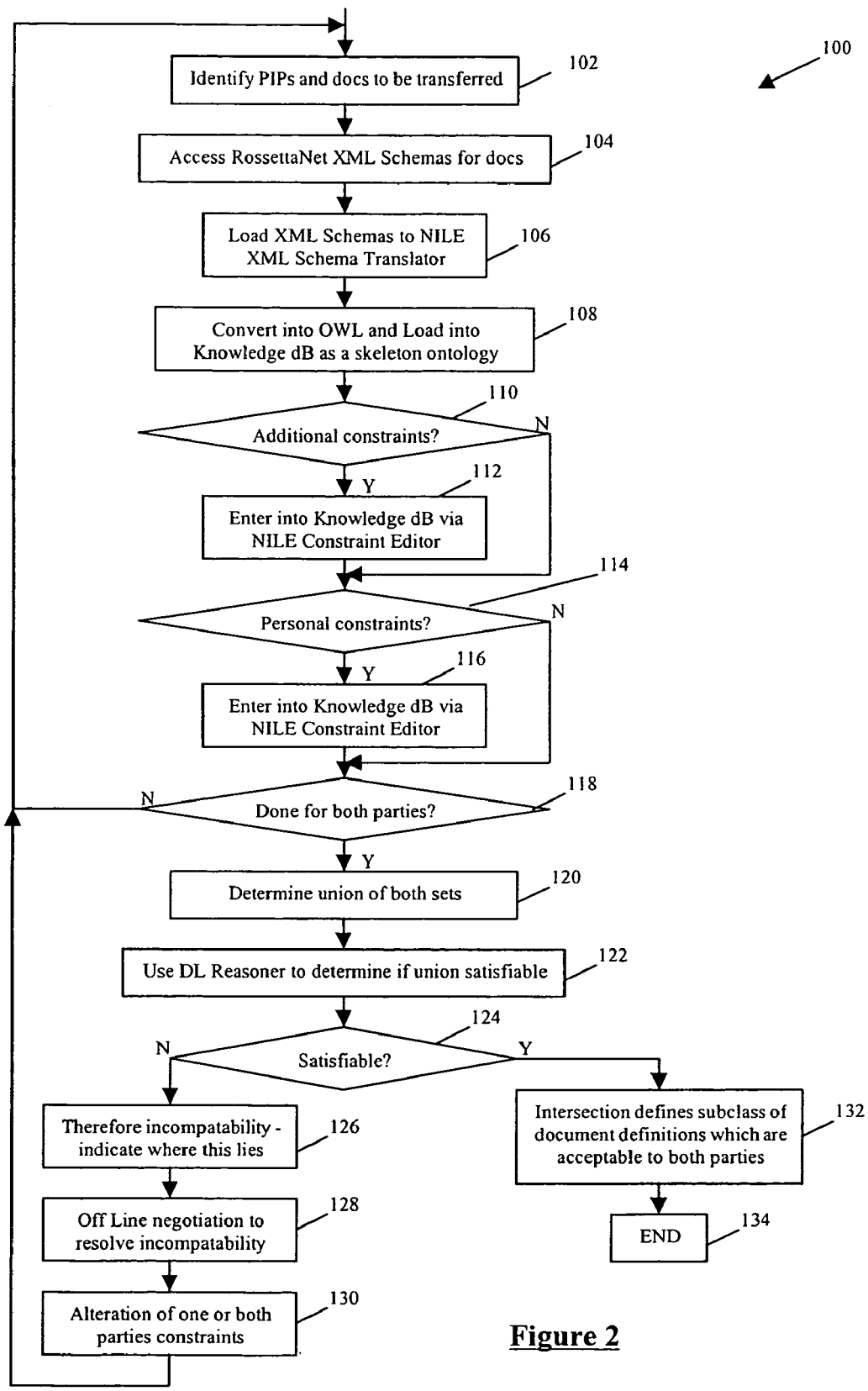
FIG. 2 is a flow diagram illustrating the steps involved in the use of the first embodiment by the two entities in a design phase to establish a subset of document definitions acceptable to both parties.

Referring to FIG. 1, a system 10 (referred to as the Nile System) embodying the present invention is shown together with the existing business processing and communication systems of a first entity 12 and a second entity 14 (businesses) who wish to establish an interactions protocol over a wide area network, in this embodiment the Internet 16.

Each of the business processing and communication systems of the first and second entities 12, 14 comprise a dedicated backend system 18 which carries out business tasks and processes data according to that entity's specific mode of operation. Quite often these are legacy systems and so their internal formats and processes cannot practically be adjusted. Each entity's system also comprises respective a data store 20 which retains within it at least the following: documents 22 to be sent to the other entity, RosettaNet Next Generation PIPs 24 describing a particular syntactic structure of interaction messages as XML Schema 26 (also shown in FIG. 1) together with a UML class diagram defining the business objects to be used in that PIP 24; and a set of constraints 28 which apply to that specific business processing and communication system's method of operation. Each entity also comprises a communications server 30 which enables the backend system to have access to the outside world via the Internet 16.

The first entity 12 also comprises a runtime validator 32 which will be described in more detail later.

The Nile system 10 is comprised of two main parts, the design validator 34 and the runtime validator 32. The design validator 34 is used by both entities to build up accurate and comparable descriptions of their respective business constraints and then to determine whether the constraint sets signify that the processes are potentially compatible. If so then a subset of acceptable constraints is generated.

The runtime validator 32 operates as an optional test to determine whether the document 22 being communicated between the entities (in accordance with the previously generated subset of acceptable constraints) does actually meet the predetermined criteria for conversion. The runtime validator thereby ensures that any errors or mistakes which appear in documents 22 can be identified.

The design validator 34 comprises a communications server 36 for enabling communications with the outside world; an XML schema to OWL translation tool 38 which converts XML schemas 26 into OWL class hierarchies and constraints, a Constraint Knowledge database 40 for storing the OWL ontology 42 for each entity; a Constraint Editor 44 for editing and browsing the OWL ontologies 42; a graphical interface 46 for assisting user editing of the stored ontology 42; a data store 48 for storing a set of constraint templates 50 for use by the graphical interface 46. One other component of the design validator 34 is actually provided in the runtime validator 32, namely a DL (Data Logic) reasoner 66 which is described later.

The Constraint Editor 44 manipulates the Constraint Knowledge database 40 and it allows an entity:
1. to populate the deployment context ontology, i.e. to define the instances and classes representing the set of PIP documents, partners and business processes which characterise a business' RosettaNet deployments;
2. to browse the business object class definitions in the OWL knowledge base;
3. to create, modify and browse constraints on business objects in a given deployment context.

The Nile Constraint Editor 44 via the graphical interface 46 provides a set of constraint templates 50 of the forms typically encountered in RosettaNet implementations. The entities create constraints using these templates 50.

Looking more closely at the templates 50 provided in the data store 48, three specific templates are provided: A cardinality constraint editor template 52, a datatype constraint editor template 54 and an interdependency constraint editor template 56. The purpose of each template is to make it significantly easier for the user to interact and edit the OWL ontology 42 in the knowledge database 40. Each of these is described in detail later.

Each OWL ontology 42 is described in detail later and from this it will be seen that it is not easy to represent the ontology diagrammatically with total accuracy. Nevertheless, to provide some graphical concept of the components of the ontology, it can be seen from FIG. 1 that these have been shown to be OWL business classes 58, OWL properties 60, each entity's own constraints 62 and their respective deployment contexts 64. Therefore, the Constraint Knowledge database 40 can be described as a structured knowledge base, in OWL, which describes the constraints that each entity's business places on business object classes depending on the deployment context.

The runtime validator 32 comprises a DL reasoner 66 as has been mentioned previously. The other two components are an XML Parser 68 for parsing a received XML document 22 and an XML to RDF (Resource Description Framework) translator 70 for putting the document into a format such that the DL reasoner 66 can check the correctness of the logic. The XML document validator is effectively a set of generic tools used for translating documents from the 'syntactic' world of XML into the 'semantic' world of RDF. Specifically, its functionality allows: a 'best effort' translation of OWL class hierarchies and constraints back into XML Schema and Schematron (see R. Jelliffe. *The Schematron Assertion Language* 1.5) and XML documents to be translated into RDF.

The way in which the Nile system 10 is used to commission a new B2B interaction protocol (design time process), and to manage an existing one (runtime validation) is now described with reference to FIGS. 2 and 3 respectively.

The design time process 100 is shown in FIG. 2. The process 100 commences with both parties/entities first identifying at Step 102 the appropriate PIPs 24 and associated documents 22 which will be transferred. Given this (assuming the PIP is next-generation), they can then access at Step 104 the RosettaNet XML Schemas 26 for the documents 22. The XML Schemas 26 are then loaded at Step 106 into the XML Schema Translator 38. This enables the XML Schemas 26 to be automatically translated at Step 108 into OWL and loaded, also at Step 108, into the Knowledge database 40 as a skeleton ontology (not shown). For example, to set up a relationship involving PIP3C3, the PIP3C3 XML Schema 26 needs to be loaded into the XML Schema Translator 38.

The process 100 then checks at Step 110 to see if there are any additional constraints 28 to be entered. If the PIP 24 specifies additional constraints 28, these are then entered at Step 112 via the Nile Constraint Editor 44. If one of the entities (businesses) has already used this PIP 24 with another partner, appropriate information will already appear in their part of the knowledge database 40, so they can skip this stage.

The entities can then augment the set of constraints 62 with personal constraints 28 which are imposed by their internal business processes and the specifics of the relationship they are trying to set up. These should represent constraints which would require business re-engineering to alter, not simply preferences. Legacy systems often impose hard constraints that cannot be altered. Often, a constraint applies to a feature of the business process which may appear in many documents and many processes. To encourage maintainability and re-usability, it is best to generate a single constraint which applies in a more general context. Previously entered constraints that are compatible with the current deployment context are automatically inherited. A check is made at Step 114 to determine if there are any personal constraints to be entered and if there are, then there are entered at Step 116 into the knowledge database via the Constraint Editor 44 possibly with the use of an appropriate constraint editor template 50 and the graphical interface to the Constraint Editor 44.

The process 100 checks at Step 118 to see if Steps 102 to 116 have been carried out for both parties that wish to set up a new interaction protocol. If this has only been done for one of the parties, then steps 102 to 116 are repeated for the other entity. Otherwise, it is assumed that both entities have provided all the required information.

When both entities have prepared their constraints, they can determine if their processes are potentially compatible. They do this by determining at Step 120 the union of both sets and determining at Steps 122 and 124, using the DL reasoner 66, if the union of both constraint sets is satisfiable. Whilst in this embodiment the DL reasoner 66 has been provided at the site of the first entity, it can either be provided by a third party or by the other or both of the entities. If the union of the constraint sets is not satisfiable as determined at Step 124, this means there is a fundamental mismatch between the two business processes, and re-engineering will be required to achieve compatibility. The process 100 then indicates at Step 126 where the incompatibility appears to reside thereby providing intelligent feedback to the entities. The two entities then need to enter into off-line negotiations at Step 128 to determine how to handle this. As a consequence, one or both entities alter at Step 130 their business process, and they also adjust their constraints 28 to reflect this, and return to the beginning of the process 100, namely Step 102. However, if the constraints are satisfiable as determined at Step 124, then the intersection of the two defines at Step 132 a subclass of the document definition which is acceptable to both entities. This is used as input to the next stage and ends at Step 134 the process 100.

Figure 4:
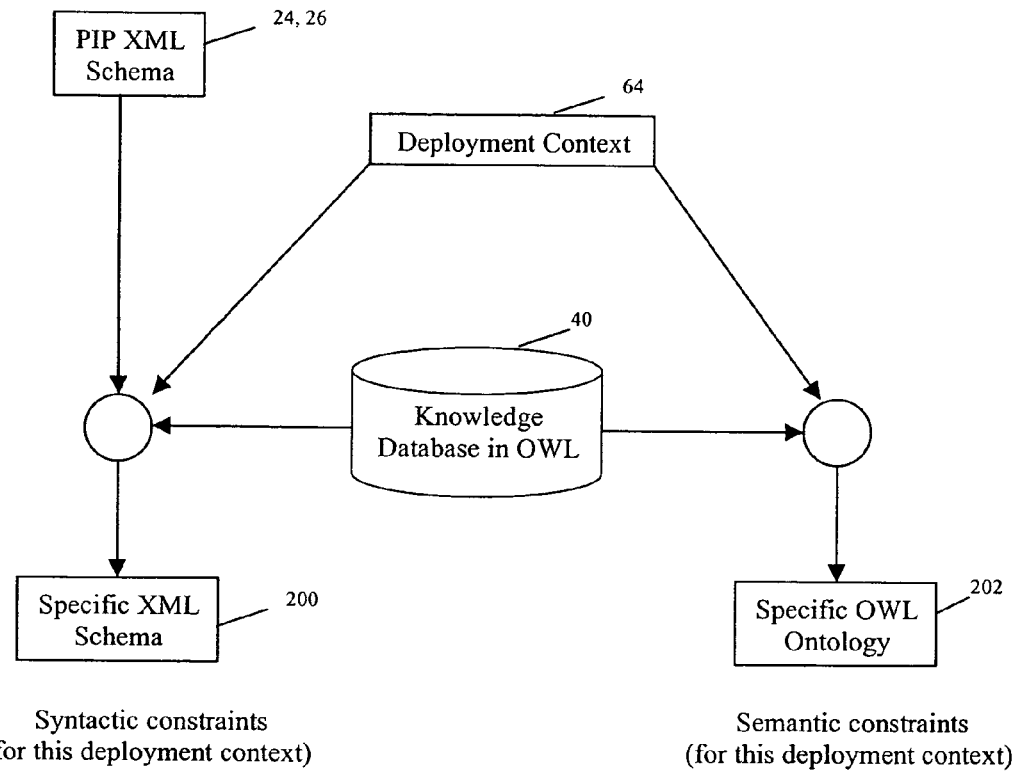
FIG. 4 is a schematic block diagram illustrating the principle of how a RosettaNet PIP can be deployed in a given context in accordance with the first embodiment of the present invention.

Referring to the schematic in FIG. 4, it is to be appreciated that for a given relationship and PIP 24, the Nile system 10 is used to generate the specific syntactic and semantic constraints for all documents which will be exchanged. This is done by generating the subset of the Constraint Knowledge database 40 that is specific to the context of this relationship—i.e. the constraints that are subclass of $\forall$ inContext.Ctx1 (see later), where Ctx1 is the instance deployment context specifying the PIP instance, the entities and the business process. The Nile system 10 thus produces a restricted version 200 of the PIP XML Schema 26 that includes the extra syntactic restrictions for use in the runtime validation process as is described later. Also it produces a restricted version 202 of the OWL ontology 42 stored in the knowledge database 40 for use in the runtime validation process as is described later.

Furthermore, well known development tools such as Contivo™ can be used together with the XML Schema, by developers to enable generation of documents at runtime as required by the execution of a PIP.

Figure 3:
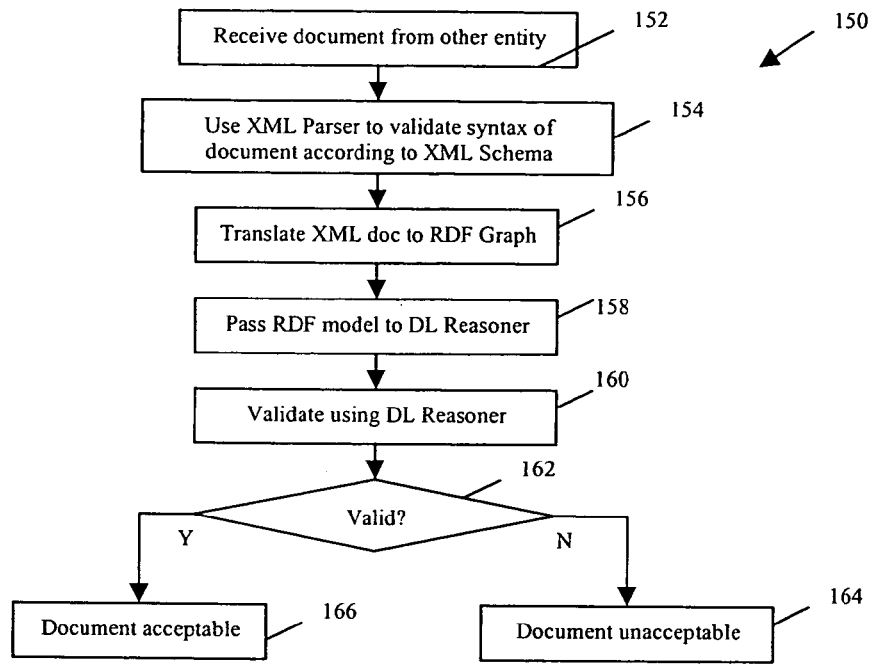
FIG. 3 is a flow diagram illustrating the steps involved in the use of the first embodiment by a first of the two entities in a run-time phase to translate a document received from the second entity into an acceptable format for the first entity.

Referring to FIG. 3, the optional but highly advantageous runtime validation process 150 is now described. The process 150 is effectively a two-phase validation process with the syntax of the incoming documents 22 being validated first and then the validation of their semantic constraints. More specifically, the process commences with receipt at Step 152 of an instance document 22 based on the designed ontology. The XML parser 68 of the runtime validator 32 is used at Step 154 to validate the syntax of the document 22 according to the XML Schema. In order to validate the syntax, specific XML Schemas (200— see FIGS. 4 and 5) generated by the design time process 100 convey all the syntactic restrictions, i.e. the data format constraints, that have been added in the Constraint Knowledge database 40. These specific XML Schemas 200 are constrained versions of the original RosettaNet XML Schemas 26 where the cardinality of certain fields have been restricted and some simple types have been restricted.

The XML document 22 is then translated at Step 156 to an RDF graph (an RDF model) and this model is subsequently passed at Step 158 to the DL reasoner 66. The DL reasoner 66 then attempts to validate at Step 160 the document 22 represented by the RDF model. The DL reasoner 66 compares the semantic nature of the document 22 with the specific OWL ontology (202— see FIGS. 4 and 5) generated by the design time process 100. If the Check at Step 164 determines that the document is not valid, then the document is considered at Step 164 to be unacceptable. However, if the Check at Step 164 determines that the document is valid, then the document is considered at Step 166 to be acceptable.

Figure 5:
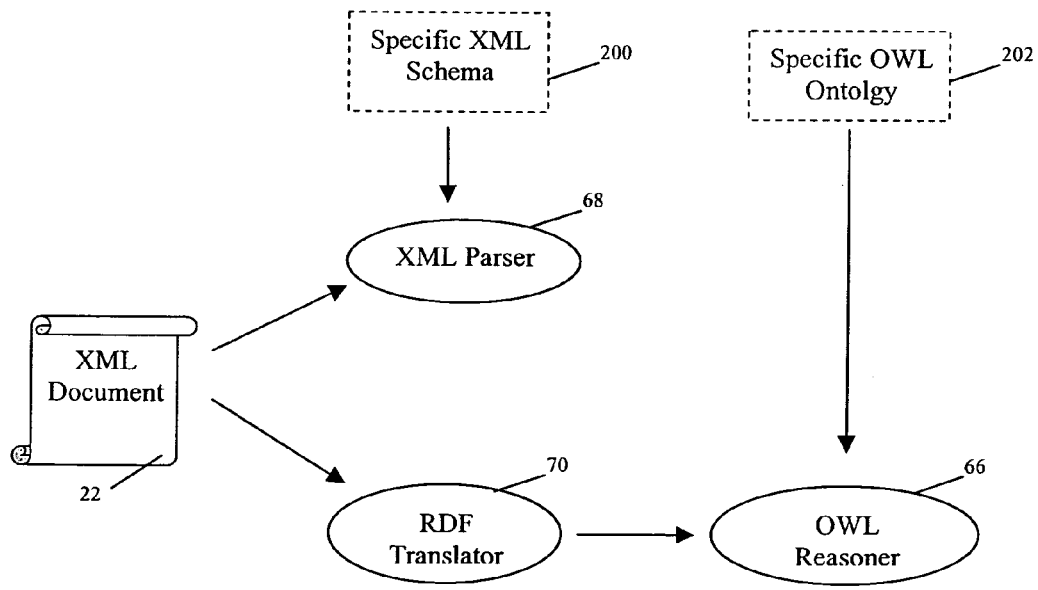
FIG. 5 is a schematic block diagram showing the process of translating documents at runtime by the runtime validator shown in FIG. 1.

FIG. 5 shows schematically how an XML document 22 is handled by the runtime validator 32. The syntactic checking of the document 22 is carried out by the XML parser 68 and the semantic checking by the combination of the RDF translator 70 and the DL reasoner 66. The resultant outputs can be checked against the results of the design time process 100, namely the specific XML schema 200 (for syntactic checks) and the specific OWL ontology 202 (for semantic checks).

Figure 3A:
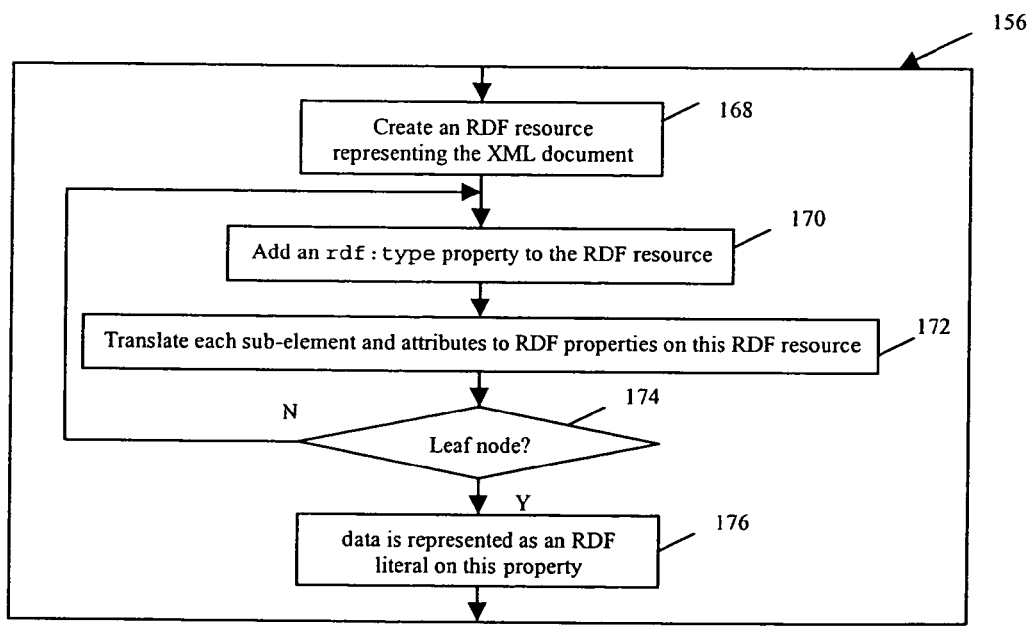
FIG. 3a is a flow diagram illustrating the steps involved in mapping a received XML schema into an RDF model as required by one of the steps shown in FIG. 3.

Turning now to FIG. 3a, the details of how the XML to RDF mapping at Step 156 is carried out is now described. This mapping is made possible because of the use of a Post-Schema Validation Infoset (PSVI) which augments the XML Infoset (See J. Cowan and R. Tobin. XML information Set title. W3C recommendation, October 2001) with information such as the type of an element or its default value. The mapping commences with the creation at Step 168 of an RDF resource representing the XML document. Then an rdf: type property is added at Step 170 to the RDF resource. Its value is the unique resource identifier of the OWL class corresponding to the XML Schema type of the XML element. Thereafter, each sub-element and attribute is translated at Step 172 to RDF properties on this RDF resource.

If an element is a leaf node as determined by a Check at Step 174, then the data is represented as an RDF literal on this property. Otherwise, the element contains attributes and/or sub-elements and it is transformed to an anonymous resource which becomes the value of the respective property. This resource is recursively transformed by repeating steps 170, 172 and 174.

In this way, developers can use the Nile System 10 in conjunction with existing products to rapidly set up new RosettaNet relationships.

Having described the Nile system 10 components in overview as well as they way in which they operate together, some of the important system elements are now described in greater detail.

XML Schema Translator 38 is effectively a mapping tool for translating XML based applications, like RosettaNet PIPs, (simple data modelling) to OWL which is a more expressive modelling language having rich semantic modelling capabilities. More specifically, XML defines a transfer syntax for tree-structured documents. XML Schema definitions hold the declarations for validating XML instance documents. These declarations are syntactic constraints on what make a valid XML document. In the Semantic Web domain, RDF models data in the form of directed labelled graphs and is layered on top of XML for serialisation. This choice of a different data model makes rich semantic descriptions and inferencing out of reach for XML applications. The present embodiment benefits from OWL modelling capabilities in B2B applications such as RosettaNet since it offers an expressive logic while keeping efficient reasoning possible (see I. Horrocks, 'Reasoning with expressive description logics: Theory and Practice. In A. Voronkov, editor, *Proc. of the 18th International Conf On Automated Deduction* (*CADE*-18), number 2392 in Lecture Notes in Artificial Intelligence, pages 1-15. Springer-Verlag, 2002).

The XML Schema translator 38 generates an OWL ontology from an XML Schema type hierarchy. The purpose the translator 38 is to lift the XML Schema to the level of an ontology. The translator 38 creates a skeleton ontology (not shown) which can be extended with the Constraint Editor. In the Nile system 10, the constraint Editor 44 is used to populate the Constraint Knowledge database 40 with business object classes 58 from the XML Schemas 26 provided by RosettaNet. Each business object class 58 hence has a syntactic definition—its XML Schema type—and a semantic definition—its associated OWL class 58.

FIG. 6 provides an overview of the mapping from XML Schema to OWL. As can be seen, different types of elements, definitions, attributes, compositors, relationships, and names expressed in XML are mapped in specific ways to OWL classes, datatype files, properties, restrictions, logical operators, collections and URIs. It is considered that the skilled addressee will have sufficient information provided here by the overview to implement this mapping and to extend it to cover more as necessary.

The following is a simple example taken from PIP3C3 (RosettaNet) which is a Notification of Invoice document. From the PIP3C3_FinancialDocument XML Schema complex type, the following OWL is automatically generated (the OWL Abstract Syntax is used in this document instead of the OWL RDF syntax since it allows from more concise expressions. Namespaces are also omitted.)

```
Class(PIP3CC__FinancialDocument partial
    Financial__Document
        restriction(lineItems allValuesFrom(PIP3C3__LineItem))
        restriction(lineItems maxCardinality(1))
)
```

From this example the skilled addressee will see that it is now possible to express constraints of a semantic nature on business objects such as PIP3C3_FinancialDocument.

As has been mentioned previously the present inventors have identified that a constraint on a business object depends on its deployment context. A deployment context is characterised by: the particular PIP document the business object it appears in, the buyer and seller trading partners and the business process used.

Figures 7, 9:
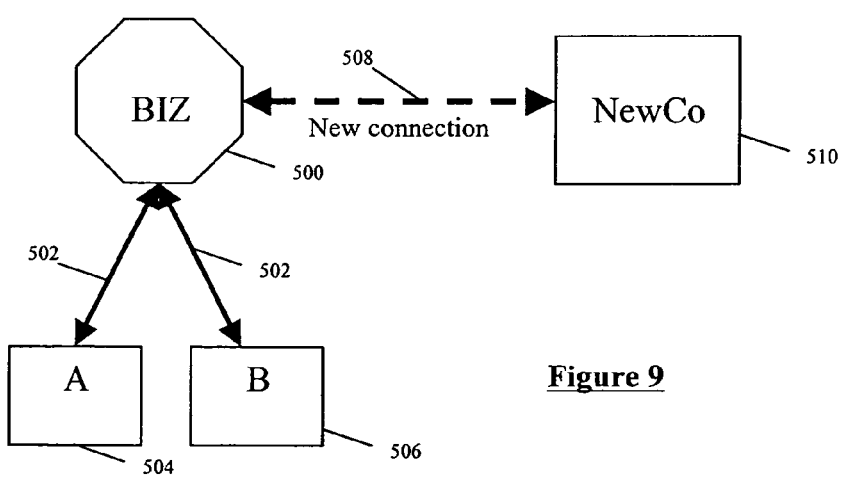
FIG. 7 is schematic diagram showing a constraint table stored within the knowledge database of FIG. 1.
FIG. 9 is a schematic block diagram showing the relationships between four different parties for use in describing an exemplary scenario for use of the present embodiment.

FIG. 7 shows an example of how each constraint 62 for an entity which is stored within the constraint knowledge database 40 identifies a deployment context 64 for the application of that constraint 62. In the provided example, each constraint 62 is dependant on the document received 300, the sender 302, the receiver 304 and the backend system 306 of the receiver. As can be seen the entries under the se column headings can use Boolean logic 308 to specify exactly under what circumstances the particular requirements of the deployment context 64 are met.

The present embodiment defines a simple OWL ontology 42 which models the deployment contexts in which a constraint can apply. The ontology 42 is comprised of three OWL classes 58, Document, Partner and Process, and four OWL object properties 60 document, buyer, seller and process. The deployment context ontology is populated with subclasses and instances of these three classes 58. For example, PIP3C3 is an instance of Document, EuropeanPartner is a subclass of Partner.

```
Class(Context complete
    restriction(document cardinality(1))
    restriction(document allValuesFrom(Document))
    restriction(requester cardinality(1))
    restriction(requester allValuesFrom(Partner))
    restriction(responder cardinality(1))
    restriction(responder allValuesFrom(Partner))
    restriction(process cardinality(1))
    restriction(process allValuesFrom(Process)))
```

A deployment context is created by subclassing the Context class and adding restrictions on one or more of the four properties 60, allowing the specification of restricted contexts 64. For example, the buyer property 60 can be restricted to the subclass EuropeanPartner of Partner, to allow the definition of a constraint 62 which applies to all European Buyers.

To represent constraints 62 depending on deployment contexts 64, the Constraint class 58 is provided and the inContext property 60.

```
Class(Constraint complete
    restriction(inContext allValuesFrom(Context))
```

A constraint on the business object class BO in context Ctx is defined as follow:

```
SubClassOf(
    intersectionOf(BO restriction(inContext allValuesFrom(Ctx)))
    Ce)
``` where Ce is a constraint expression (section 3.2.2).

Given such a constraint, given BO' a business object class such that SubClassOf(BO' BO) and given Ctx a context such that SubClassOf(Ctx' Ctx), the constraint Ce also applies on BO' since

```
SubClassOf(
    intersectionOf(BO' restriction(inContext allValuesFrom(Ctx')))
    Ce)
``` is also true. For instance, a constraint on the business object FinancialDocument for all European partners buyers:

```
restriction(inContext allValuesFrom(restriction buyer
    allValuesFrom(EuropeanPartners)))
``` will also apply on the PIP3C3_FinancialDocument (which is a subclass of FinancialDocument) in the more restrictive context where the buyer is the European partner A and the business process BP1.

The DL reasoner 66 is used to do inferencing on the OWL ontologies 42 and it can be used specifically to check the satisfiability of an ontology 42. In the present embodiment the DL reasoner 66 is provided by Racer™ (see V. Haarslev and R. Moöller. Description of the RACER system and its applications. *In Proceedings International Workshop on Description Logic (DL-2001)*, 2001), though it could also be provided by FacT (see I. Horrocks. FacT and iFacT. In P. Lambrix, A. Borgida, M. Lenzerine, R. Möller, and P. Patel-Schneider, editors, *Proceedings of the International Workshop on Description Logics (DL'99)*, pages 133-135, 1999). The DL reasoner 66 has been used to check the consistency of the constraints 62 in the Constraint Knowledge database 40. Having an automated way of checking this consistency is very beneficial in the Nile system 10 since constraints 62 could be derived from super-classes or super-contexts.

Constraint expressions can be arbitrarily OWL expressions that restrict the business object class (and subclasses).

As an example, the constraint that restricts the class PIP3C3_FinancialDocument in context Ctx to have at most 10 lineItems elements and at least 1 soldTo elements can be written:

```
SubClassOf(
    intersectionOf(PIP3C3_FinancialDocument restriction(inContext
        allValuesFrom(Ctx)))
    intersectionOf(restriction(lineItems maxCardinality(10))
    restriction(soldTo
        minCardinality(1)))
)
```

A more complex example is now provided constraining the class PIP3C3_FinancialDocument in context Ctx. If any PIP3C3_FinancialDocument instance has a lineItems element, this lineItems element must have at least one totalLineItemAmount element. This is expressed as follow:

```
SubClassOf(
    intersectionOf(PIP3C3_FinancialDocument
        restriction(inContext allValuesFrom(Ctx)))
    restriction(lineItems allValuesFrom(totalLineItemAbount
    minCardinality(1)))
)
```

Because the RosettaNet NextGen PIPs are designed using UML, semantic constraints on PIP document specifications are written in OCL. The inventors' study of these specifications show that these constraints only use a subset of OCL and can all be represented in OWL. The constraint editor 44 has successfully been used to model these constraints in OWL. An example is now provided of an OCL constraint taken from PIP3C3 and its translation in OWL.

```
Context FinancialDocument
    inv:
        if self.isLockBoxUsed='yes' then
            self.transferTo->size=1 and
            self.remitToAddress.addressLine1->size=1
                and
            self.remitToAddress.globalCountryCode->size=1
                and
            self.remitToAddress.nationalPostalCode->size=1
                and
            self.remitToAddress.regionName->size=1
        endif
``` is translated into:

```
Class(FinancialDocument partial
    unionOf(
        complementOf(restriction(isLockBoxUsed value("Yes")))
        intersectionOf(
            restriction(transferTo cardinality(1))
            restriction(remitToAddress allValuesFrom(restriction
                addressLine1
    cardinality (1)))
            restriction(remitToAddress allValuesFrom(restriction
                globalCountryCode
    cardinality (1)))
            restriction(remitToAddress allValuesFrom(restriction
                nationalPostalCode
    cardinality(1)))
            restriction(remitToAddress allValuesFrom(restriction
                regionName
    cardinality(1)))
        )
    )
)
```

OWL is a powerful ontology language but it is also quite complex for non-expert users. One of the goals of the Nile Constraint Editor 44 is to hide this complexity from RosettaNet implementors (the entities). An analysis of RosettaNet deployments has been carried out to determine the kinds of constraint commonly applied to documents by businesses, and three key classes have been identified by the inventors. The templates for each class, together with an example constraint of that class are now described.

Figure 8A:
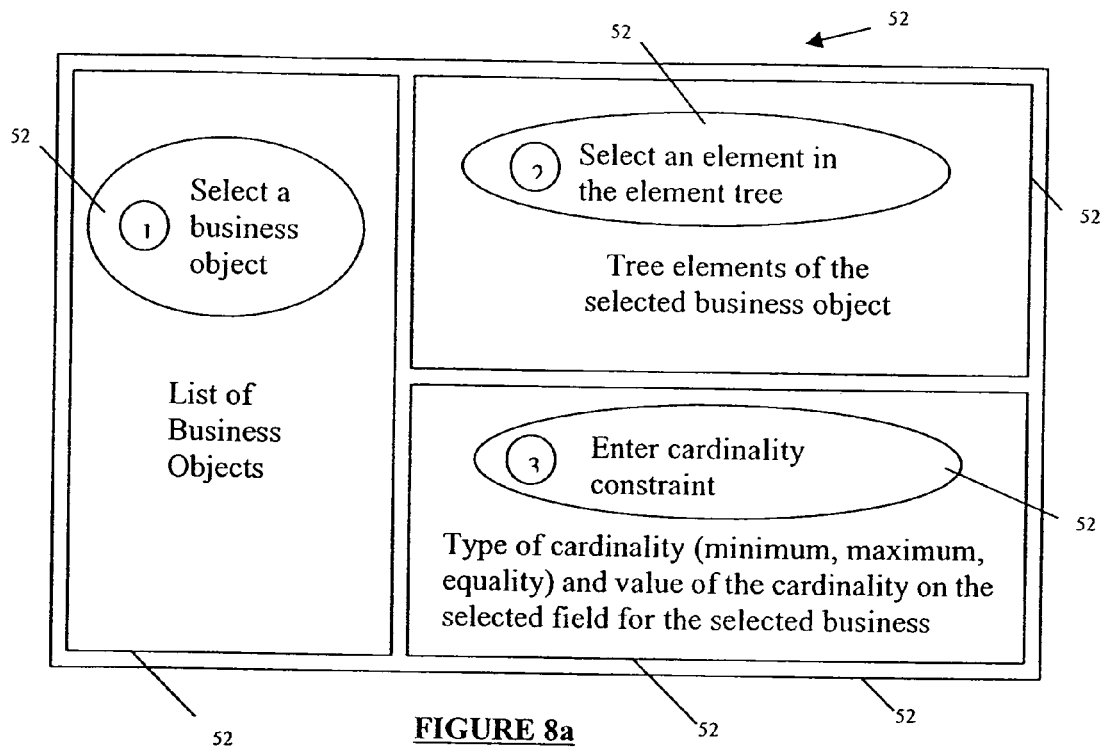
FIG. 8a is a schematic diagram showing a cardinality constraint template generated by the Graphical Interface of the first embodiment shown in FIG. 1.

Referring now to FIG. 8a, a Cardinality constraint template 52 is shown. This template 52 as the name suggests assists in the input and editing of Cardinality constraints. Because of the diversity of deployment scenarios, the RosettaNet specification may leave a lot of flexibility for the cardinality of some fields (many fields in the specifications have the 0 . . . ∞ cardinality). However, specific deployment contexts may impose more constrained cardinalities.

For example to restrict the maximum cardinality of lineItems to 10 on all Invoice classes in context Ctx, the tool generates the following statement:

```
SubClassOf(
    intersectionOf(Invoice restriction(inContext allValuesFrom(Ctx)))
    restriction(lineItems maxCardinality(10))
)
```

The cardinality Constraint Template 52 comprises three graphical sections, which are each described in turn. The first graphical section 400 lists all of the business objects present in the constraint knowledge database 40. This section also provides functionality tools 402 to enable the user to select one of the listed business objects. The second graphical section 404 shows all of the tree elements of the selected business object. This section 404 also provides the graphical tools 406 to enable the user to select an element in the element tree. The user having firstly selected a business object, then selected an element (field) from its element tree, now accesses the third section 408 where the cardinality constraint 62 is to be specified. The third section 408 allows the user to select the type of cardinality (maximum, minimum, equality) and its value in respect of the selected element of the selected business object. Functional tools 410 are provided for the user to make his selection of these final parameters to specify the constraint details.

Given a business object BO, the template 52 allows the user to enter a minimum cardinality constraint, maximum cardinality constraint or an exact cardinality constraint on an element of a class. Also, because classes have a hierarchy of elements, the template provides an Xpath style (XML Path Language (XPath) Version 1.0 W3C Recommendation 16 Nov. 1999) mechanism 406 to select the element. The selector e1/e2/ . . . /en will first select element e1, then element e2 which is a subelement of e1, until it reaches en. The graphical interface shown in FIG. 8a shows the tree of elements of a given class in the second section 404 and allows the specification of the cardinality constraint on the selected element.

Semantically, cardinality constraints are written in the knowledge base in the following way:

```
Cardinality n of element e1/.../en on BO in context Ctx:
SubClassOf(
    intersectionOf(BO restriction(inContext allValuesFrom(Ctx)))
    restriction(e1 allValuesFrom(restriction(e2 allValuesFrom(....(restriction en cardinality(n))...))))
)
Maximimum cardinality n of element e1/.../en on BO in context Ctx:
SubClassOf(
    intersectionOf(BO restriction(inContext allValuesFrom(Ctx)))
    restriction(e1 allValuesFrom(restriction(e2 allValuesFrom(....(restriction en maxCardinality(n))...))))
)
Minimum cardinality n of element e1/e2.../en on BO in context Ctx:
SubClassOf(
    intersectionOf(BO restriction(inContext allValuesFrom(Ctx)))
    restriction(e1 allValuesFrom(restriction(e2 allValuesFrom(....(restriction en cardinality(n))...))))
)
```

Figure 8B:
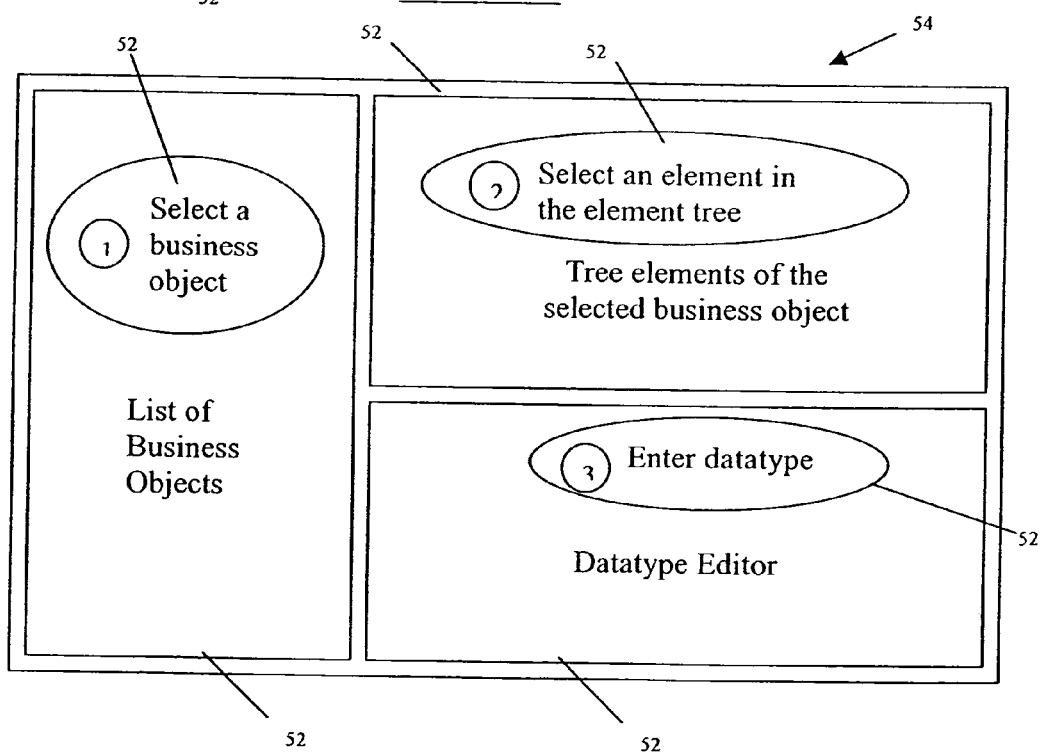
FIG. 8b is a schematic diagram showing a data format constraint template generated by the Graphical Interface of the first embodiment shown in FIG. 1.

Referring now to FIG. 8b, a Data format constraint template 54 is shown. This template 54 assists in the input and editing of Data format constraints. For the same reasons as the cardinality constraints, the format of some data needs to be constrained. Common examples include the size of a string or the format of a date. In OWL terms, the relevant datatype property needs to have a more restricted XML Schema type. The template generates a restricted XML Schema type and constrains the datatype property to this newly defined type.

For instance the XML Schema simple type ProprietaryDocumentIdentifier in PIP 3C3 is defined as being an xsd: string. XML Schema datatype restrictions can be used to restrict the length of the string or its format with a regular expression.

The data format constraint template 54 also comprises three graphical sections, which are each described in turn. The first graphical section 420 lists all of the business objects present in the constraint knowledge database 40. This section 420 also provides functionality tools 422 to enable the user to select one of the listed business objects. The second graphical section 424 shows all of the tree elements of the selected business object. This section 424 also provides the graphical tools 426 to enable the user to select an element in the element tree. The user having firstly selected a business object, then selected an element (field) from its element tree, now accesses the third section 428 where a datatype editor is provided. The third section 428 allows the user to edit a datatype and thereafter use functional tools 430 which are provided for the user to enter in the datatype into the knowledge database 40.

The data format constraint template 54 therefore works in a similar way to the cardinality constraint template 52 described above. The data format constraint template 54 allows the user to constraint any subelement of a business object to have a subtype of the data type defined by the RosettaNet standard. More specifically, the user uses the graphical template to select the business object to constrain and then the subelement from the element hierarchy. Depending on the XML Schema based datatype defined in the RosettaNet standard for the selected element (string, date, integer, . . . ), the editor provides a type editor for this element. The type editor depends on the base type and allows constraint of XML Schema facets of the base type (see. XML Schema Part 2: Datatypes W3C Recommendation 02 May 2001 for a list of XML Schema base types and their facets). For instance, for an integer element, the type editor would provide ways to customise the following facets: totalDigits, fractionDigits, pattern, whiteSpace, enumeration, maxInclusive, maxExclusive, minInclusive, minExclusive.

Semantically, the data format template are entered in the knowledge base in the following way.

```
Constraint on element e1/.../en on BO to be of data type dt in context Ctx:
SubClassOf(
    intersectionOf(BO restriction(inContext allValuesFrom(Ctx)))
    restriction(e1 allValuesFrom(restriction(e2 allValuesFrom(....(restriction en allValuesFrom(dt))...))))
)
```

Figure 8C:
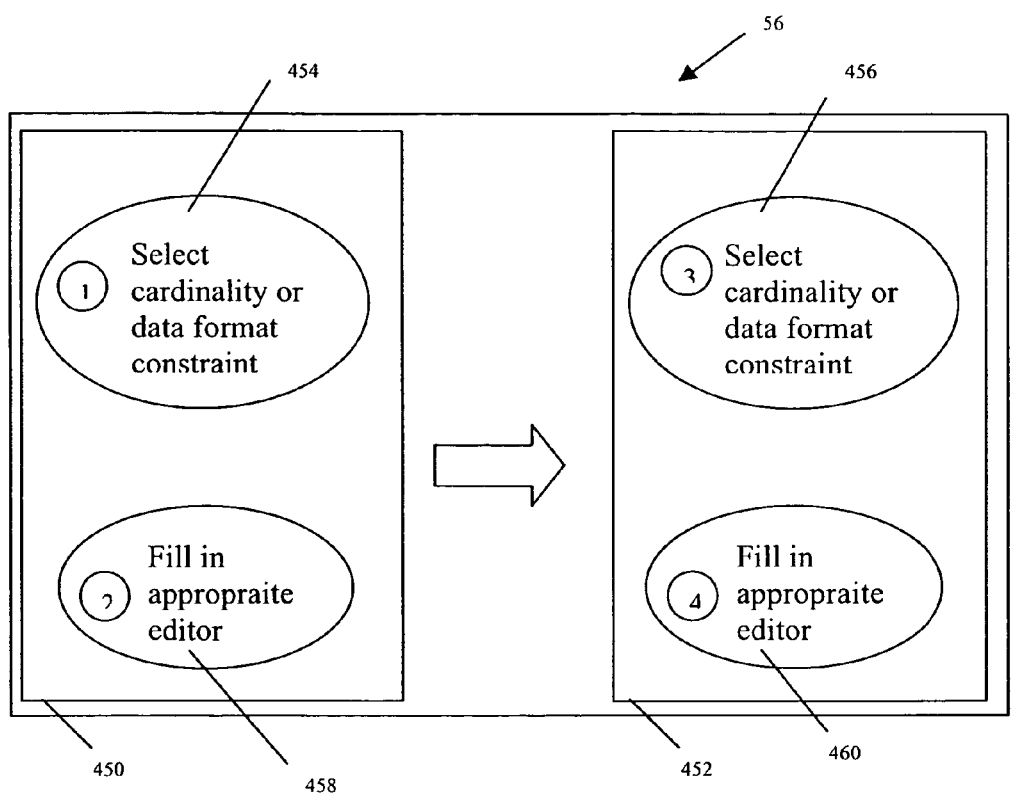
FIG. 8c is a schematic diagram showing a field constraint template generated by the Graphical interface of the first embodiment shown in FIG. 1.

Referring now to FIG. 8c, an Interdependency constraint template 56 is shown. This template 56 assists in the input and editing of Interdependancy constraints. This can include interdependency of fields: the presence of a field, or the value of a field, or may imply a cardinality constraint of a data format constraint. An example of such a constraint is provided below:

on class FinancialDocument, if there is a soldTo element, there must also be a soldToTax element.

```
SubClassOf(
   restriction(inContext allValuesFrom(Ctx))
   unionOf(
      complementOf(intersectionOf(FinancialDocument restriction(soldTo
minCardinality(1))))
      intersectionOf(FinancialDocument restriction(soldToTax
         minCardinality(1)))
   )
)
```

The interdependency Constraint Template 56 is at a higher level than the cardinality and data format constraint templates 52, 54 in that it allows interdependency between two constraints to be readily defined. The template 56 comprises two graphical sections, a first section 450 for specifying the trigger event and the second graphical section 452 specifying the resultant event. Within each graphical section 450, 452, graphical selection tools 454 and 456 respectively are provided for selection of the appropriate cardinality or data format constraint. Also provided is an appropriate editor 458, 460 for editing that constraint to ensure that it describes the trigger event and resultant event correctly.

This template allows the user to model co-constraints of the form: in the condition that a cardinality constraint or a data format constraint holds true on an element, then a cardinality constraint or a data format constraint must hold true on another element. Logically, it connects the two simple constraint types seen earlier (cardinality and data type) with an implication. The graphical interface 56 reuses the two editors described above in the cardinality and data format constraint templates 52, 54. A user selects the type of constraint desired for the left and right parts of the implication and fills in the corresponding template.

Semantically, A implies B is written is OWL unionOf (complementOf(A) B). Hence the following constraint expressions.

The Constraint

"in context Ctx, if condition1 applies on class BOL then conditions must apply on class BOR"

where condition1 and condition2 can be of the form:
   cardinality n on element e1/e2/ . . . /en
   maximum cardinality n on element e1/e2/ . . . /en
   minimum cardinality n on element e1/e2/ . . . /en
   data type dt on element e1/e2/ . . . /en is written in the knowledge base:

```
SubClassOf(
   restriction(inContext allValuesFrom(Ctx))
   unionOf(
      complementOf(
         intersectionOf(BOL restriction(el1 allValuesFrom(restriction(el2
allValuesFrom(....(condition1(eln))...))))))
      intersectionOf(BOR restriction(er1 allValuesFrom(restriction(er2
allValuesFrom(....(condition2(ern)...)))))
   )
)
``` where condition1(e) and condition2(e) are of the form:
   restriction(e cardinality(n))
   restriction(e maxCardinality(n))
   restriction(e minCardinality(n))
   restriction(e allValuesFrom(n))

Regarding the runtime validation process 150, it is to be appreciated that before the generated documents can be processed by the DL reasoner 66, the generated RDF model must be pre-processed. This is because DL reasoners make the open-world assumption and it is necessary therefore to 'close the world'. The open-world assumption means that what cannot be proven to be true is not necessarily false. For instance, if a property is not present, it is wrong to assume it will never be present. This fits very well with the nature of the Semantic Web, as statements will be added as the Web is browsed or crawled. In a B2B context however, the closed-world assumption is usually made: the documents being exchanged usually contain all the information that is required. To 'close the world', for each individual and each property, the number of times the property appears on the individual is counted; this property on this individual is then restricted to have its occurrence number as its maximum cardinality. Further the default values from the PSVI are also assert on some properties. The output of this process can then be submitted to the DL reasoner 66 (Racer™) which can validate the instance.

To close the world, one has to state that the known values of given properties on a given individual are exactly the properties of this individual. The algorithm for closing the world is hence:

For each individual i in the knowledge base:
   For each property p in the knowledge base:
      Count the number of values for p on i and assert that this there is the maximum cardinality on p for i.

Whilst the present embodiment uses a DL reasoner 66 to validate the semantic constraints it is also possible for this to be substituted for by a technique of generating 'best effort' schemas as is described below.

XML Schema is not the only schema language for XML. Other schema languages are available, and all have been designed with different assumptions and different emphasis (see D. Lee and W. W. Chu. Comparative Analysis of six XML schema Languages. *SIGMOD Record (ACM Special Interest Group on Management of Data)*, 29(3):76-87, 2000). Where the constraints expressed in OWL follow certain known patterns—as is the case for those generated by the Nile system 10—, these can be translated into Schematron schemas. The inventors have in a second embodiment of the present invention successfully translated the constraints showing cardinality interdependency between fields into Schematron schemas and other patterns could also be similarly translated. The benefit of this approach is that it integrates well with current XML processing (since implementations are usually XSLT based) and would be easily accepted by developers. Its drawbacks are that constraint patterns must be known in advance, and only selected OWL can be converted.

Worked Example

To assist in the understanding of this invention a worked example of how the present invention could be used is now described with reference to FIG. 9.

Biz 500 is a UK based company that does business electronically with other business partners. In particular, Biz 500 has existing RosettaNet connections 502 with European companies A 504 and B 506.

Biz 500 wants to set up a new business relationship 508 with NewCo 510. Biz 500 wants to order goods from NewCo 510 and conduct this business electronically. Because of their previous experience in using the RosettaNet standard, Biz 500 and NewCo 510 decide that the Order Management, including transportation, distribution and invoicing of the goods, will be done using RosettaNet electronic documents.

Business Document Definitions

Biz and NewCo agree on the particular sequence of RosettaNet documents to use for their new connection. RosettaNet documents are called Partner Interface Process, or PIP. Among the PIP documents that are used, Biz and NewCo will use 'PIP3B2 Notify of Advance Shipment' and 'PIP3C3 Notify of Invoice '.

Biz 500 has similar links 502 with companies A 504 and B 506. In particular, the links 502 with A and B also use PIP3B2 and PIP3C3.

Lifting

RosettaNet defines generic business objects (not shown) such as Address, Tax or Invoice. These business objects are used and sometimes refined in the definition of PIP documents. Each PIP document is defined using an XML Schema 26 provided by RosettaNet.

For each document used, Biz 500 transforms the business objects defined in the XML Schema 26 into a logical semantic description. The Nile system 10 conducts this operation automatically.

Example

RosettaNet defines the Tax class as:

```
<xs:complexType name="Tax" abstract="true">
    <xs:annotation>
        <xs:documentation>Abstract type representing any kind of tax</xs:documentation>
    </xs:annotation>
    <xs:sequence>
        <xs:element name="taxRate" type ="primitives:PercentageAmount" minOccurs="0"/>
        <xs:element name="financialAmount" type="primitives:FinancialAmount"/>
    </xs:sequence>
</xs:complexType>
```

This definition gets translated in a logical expression. Using description logic syntax, the definition of the Tax class becomes:

```
Class(Tax partial
    restriction(taxRate maxCardinality(1))
    restriction(taxRate
        allValuesFrom(PercentageAmount))
    restriction(financialAmount cardinality(1))
    restriction(financialAmount
        allValuesFrom(FinancialAmount)))
```

Constraint Editing

Businesses never implement the full RosettaNet specification. Because of business practices and/or limitations imposed by backend systems, businesses have constraints on the PIP documents they can send or receive. Hence, for each new RosettaNet connection, businesses have to understand the constraints on the business objects which compose the PIP documents composing the connection.

Deployment Context

In order to promote reuse of the constraints between PIP documents and from one RosettaNet connection to the next, Biz 500 uses the Nile system 10 to model the constraints augmented with deployment contexts 64. The deployment context 64 of a constraint 62 captures the reasons for which a business object should be constrained. In other words, it dictates when a constraint 62 should apply.

Parameters of the deployment context in this example include:

Document: the list of PIP documents in which the business object occurs;

Sender: the list of business partners which send this business object;

Receiver: the list of business which receive this business object;

Backend system: the list of backend systems that will consume or generate this business object.

Other parameters not used in the present example but which could be included in alternative deployments could be Business Process or Department.

Values for these parameters are expressed in terms of Boolean combinations of instances and groups of documents, partners, backend systems, etc.

Examples of Documents:
PIP3C3 (Notify of Invoice)
PIP3C3 (Notify of Invoice) OR PIP3C4 (Notify of Invoice Reject)
The group of all PIPs in the segment 3C (Returns and Finance): PIP3C1, PIP3C2 . . . , PIP3C7.

Examples of Senders or Receivers:
NewCo
A OR B
All the European partners (which include A, B and NewCo)

Examples of Backend Systems:
The SAP system sap1
All the SAP systems
All the SAP OR the Oracle systems NewCo Deployment Among all the constraints present from previous deployments, Biz 500 wants to review those that will apply for the new deployment 508 with NewCo 510. Given a deployment context, the Nile system 10 gives a list of constraints 62 that apply in this context 64, with an explanation as to why each constraint 62 applies.

Example

One step of the business process is that NewCo 510 sends a 'PIP3C3 Notify of Invoice' to Biz 500. Biz 500 will process this document 24 with its SAP system 18 called sap 1. Hence the deployment context 64 representing the connection with NewCo 510 is:

(document=PIP3C3, sender-NewCo, receiver=Biz, backend=sap1).

Biz 500 enters this context into the Nile system 10. Among the constraints previously entered in the constraint knowledge database 40, the system 10 generates a list of constraints 62 that would apply in this specific context 64.

For instance, Biz 500 has a constraint on the Tax business object: each time a Tax object is used in any PIP 24 of the 3C series received from a European partner, the taxRate field is mandatory. This knowledge comes from previous experience with partners A 504 and B 506. This constraint was entered in the Nile system 10 as:

Constraint1:

on Tax, taxRate is mandatory, in deployment context (document=all documents in the 3C serie, sender=EuropeanPartner, receiver=Biz, backend=any)

The Nile system 10 lists 'on Tax, taxRate is mandatory' as one of the constraints 62 that would apply for the NewCo deployment, with the explanation that PIP3C3 is part of the 3C series and that NewCo 510, being based in France, is a European partner.

Consistency Checking

The Nile system 10 checks for inconsistencies as constraints 62 coming from different deployment contexts 64 could be incompatible. The system 10 flags any such inconsistencies.

Inconsistencies can arise for two reasons:
  When entering a constraint 62, the deployment context 64 that was chosen for this constraint 62 was too generic and should be adjusted to be more specific. The way the constraint 62 was modelled was inaccurate and introduced a 'bug' in the constraint knowledge database 40.
  The constraint knowledge database 40 actually reflects the reality. Typically, the inconsistency shows that a backend system 18 or a business process needs to be modified. Once modified, constraints 62 need to be modified to reflect the reality.

Example

From previous experience, Biz 500 has a constraint 62 which says that all its SAP systems 18 cannot process the taxRate field of the Tax object. The constraint 62 was entered as:

Constraint2:

on Tax, taxRate is absent, in deployment context (document=any, sender=any, receiver=Biz, backend=All SAP systems)

When entering the deployment context 64 corresponding to the NewCo connection 508 (document=PIP3C3, sender=NewCo, receiver=Biz, backend=sap1), it is clear that constraint2 should apply since sap1 is a SAP system. So both constraint1 and constraint2 should apply. But the system shows that constraint1 and constraint2 are incompatible in the NewCo context 64 since the taxRate field should be mandatory and absent at the same time.

After checking its backend systems 18, Biz 500 realises that constraint2 incorrectly modelled the reality since this constraint 64 only applies for US-based partners. The constraint is adjusted to:

Constraint2:

on Tax, taxRate is absent, in deployment context 64 (document=any, sender=US partners, receiver=Biz, backend=All SAP systems)

With the new version of the constraint 62, the system 10 successfully checks that there are no more inconsistencies.

New Constraints

It is very likely that for a new deployment, new constraints 62 will get added into the constraint knowledge database 40. Using the graphical interface 46, Biz 500 adds new constraints 62 into the database 40. The user interface 46 provides some templates 50 for those constraint types that are the most common:
  Cardinality constraint (the occurrence of a field)
  Datatype constraint (the value or format of a field)
  Interdependency constraint (the value or presence of a field having an influence on the value or presence or another field)

To each new constraint 62 added into the constraint knowledge database 40, Biz 500 associates the most general deployment context 64 in which it will apply. By having a general deployment context 64, Biz 500 will be able to reuse this constraint 64 in various different deployments.

Each time a constraint is added into the constraint knowledge database 40, the database 40 is checked for consistency.

Constraint Reconciliation

Biz 500 receives the constraints 62 from its partner NewCo 510. NewCo 510 has also modelled the constraints 62 using the Nile system 10.

Biz 500 can check the compatibility of the merged set of constraints. The system 10 will flag inconsistencies. When incompatibilities occur, the partners need to manually agree on the changes to be made (usually one of the partners must alter their backend system 18 or business process). The constraints 62 are readjusted to reflect the changes and are checked again for consistency until all problems are solved.

Deployed System

Once the constraints 62 are agreed, software developers can deploy the system, taking the constraints 62 into account in their implementation. However, errors can occur and it is a good idea to check that business documents 22 do comply with the agreed constraints 200,202. Therefore the Nile system 10 has a runtime component that can check the validity of the XML documents 22 automatically. XML documents 22 are lifted to RDF and the constraints 62 are checked on the RDF documents without additional software development.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example in RosettaNet PIPs, XML Schemas are normative and the UML diagrams document the schemas. However, the Nile system 10 could be enhanced by also supporting UML. It could then be used for other standards such as ebXML that attach more importance to UML. Further, developers of the Nile system could also benefit from existing work on reasoning on UML and OCL with description logics.

It is also to be appreciated that whilst the present invention has specifically been described with respect to a RossettaNet implementation, the present invention, in all its aspects, is not restricted to this way of describing existing interactions protocols as the messaging guidelines. The present invention is not even limited to the use of XML Schema as the basic way of describing such ways of messaging. Rather, many different techniques can be used, for example object-oriented languages could be used to described the way a given entity is willing to interact with other entities including the constraints that a particular entity places on the interaction.

The invention claimed is:

1. A method of defining a common interactions protocol between two entities, the method comprising:
  the method performed by a communication server arranged for:
    converting syntactic specifications of multiple documents to be passed between the entities, into a skeleton semantic web ontology comprising a set of classes;
    deriving for each entity a respective set of constraints including semantic constraints established by the entity on aspects of the classes of the skeleton ontology;
    calculating the union of the two sets of constraints;

determining, using a constraint resolver that comprises a description logic reasoner, whether the union is satisfiable, and:

where the union is satisfiable, deriving from the intersection of the two sets of constraints a restricted document specification that is compatible with the constraint sets of both entities; and where the union is not satisfiable, indicating where any incompatibility lies.

2. The method according to claim 1, wherein the syntactic specifications are input as XML Schemas.

3. The method according to claim 1, wherein the restricted document specification comprises both a specification of applicable syntactic constraints and a specification of applicable semantic constraints.

4. The method according to claim 1, wherein the communication server is further arranged for:

pre-specifying semantic constraints and associating them with deployment contexts;

the deriving of the set of constraints for that entity comprising defining a particular deployment context for the common interactions protocol, and determining which of the pre-specified semantic constraints are applicable to said particular deployment context.

5. The method according to claim 4, wherein the deployment context associated with at least one pre-specified semantic constraint is specified in generic terms covering multiple particular deployment contexts.

6. The method according to claim 4, wherein the deployment contexts are specified by one or more elements from the set comprising the document, the sender, the receiver, the backend system, the business process and the department.

7. The method according to claim 6, wherein the deployment contexts are expressed using Boolean logic between the elements.

8. The method according to claim 4, wherein pre-specifying comprises specifying constraints applicable to whole classes of objects/processes.

* * * * *